US00RE39430E

(19) United States
(12) Reissued Patent
Novoa

(10) Patent Number: US RE39,430 E
(45) Date of Reissued Patent: Dec. 19, 2006

(54) HANDLEBAR GRIP

(76) Inventor: Luis Novoa, Finkenweg 10, CH-2257 Studen (CH)

(21) Appl. No.: 29/181,535

(22) Filed: May 12, 2003

Related U.S. Patent Documents

Reissue of:
(64) Patent No.: Des. 469,330
Issued: Jan. 28, 2003
Appl. No.: 29/152,567
Filed: Dec. 26, 2001

(30) Foreign Application Priority Data

Jun. 27, 2001 (WO) ..... DMA/059 789

(51) LOC (8) Cl. ..... 08-06
(52) U.S. Cl. ..... D8/303
(58) Field of Classification Search ..... D8/303; 74/551.8, 551.9; 16/110.1, 421, 430
See application file for complete search history.

(56) References Cited

U.S. PATENT DOCUMENTS 5,165,301 A * 11/1992 Jeshurun et al. ..... 74/551.1
D340,636 S * 10/1993 Ming-Chang ..... D8/303
5,269,196 A * 12/1993 Rafac ..... 74/551.1
D352,443 S * 11/1994 Chen ..... D8/303
D354,216 S * 1/1995 Chen ..... D8/303

FOREIGN PATENT DOCUMENTS

FR 2654698 * 5/1991

* cited by examiner

*Primary Examiner*—Alan P. Douglas
*Assistant Examiner*—Linda Brooks
(74) *Attorney, Agent, or Firm*—Ostrolenk, Faber, Gerb & Soffen, LLP

(57) CLAIM

The ornamental design for a handlebar grip, as shown and described.

DESCRIPTION

FIG. 1 is a perspective view of a handlebar grip of my new design; and,
FIG. 2 is an enlarged end view thereof.

1 Claim, 1 Drawing Sheet

Figure 1:
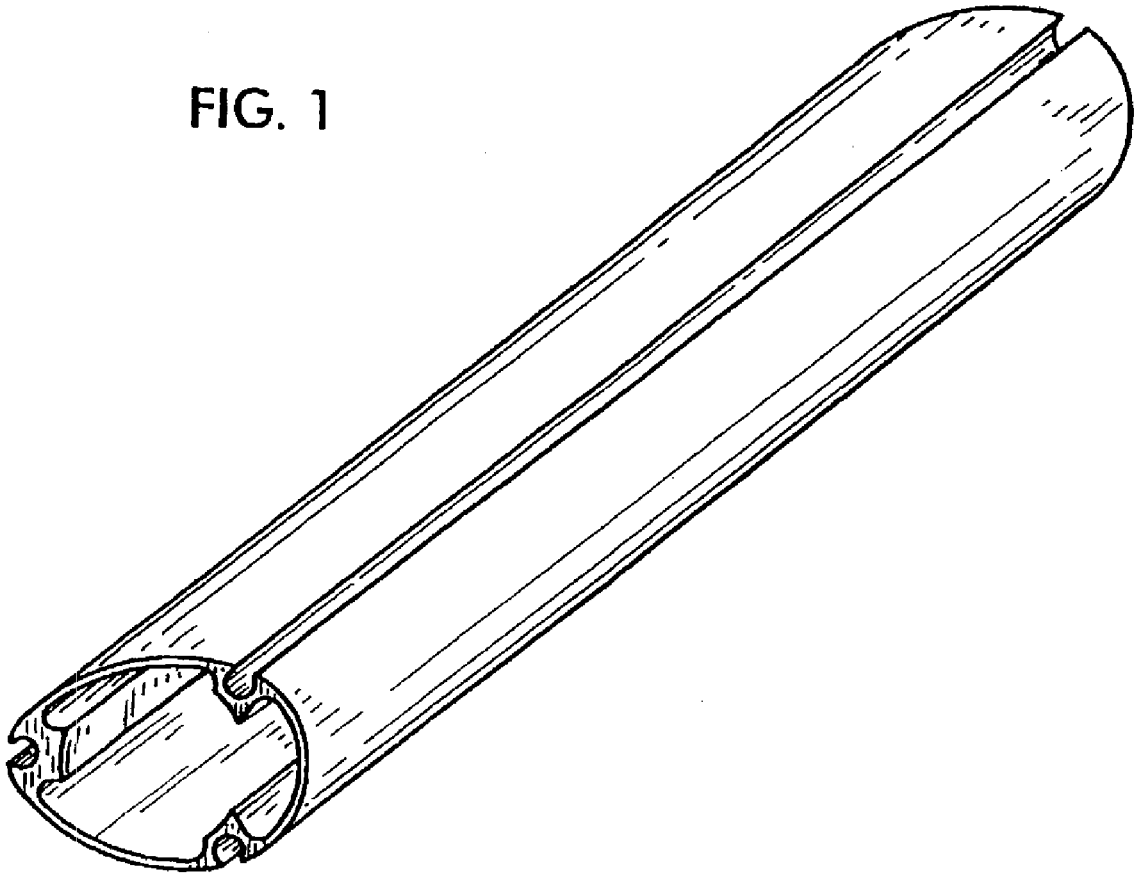
Figure 2:
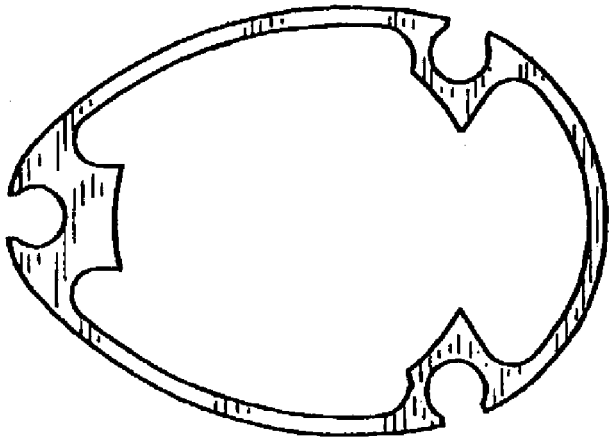

Matter enclosed in heavy brackets [ ] appears in the original patent, but forms no part of this reissue; matter printed in italics indicates the additions made by reissue.